US006782930B2

(12) United States Patent
Kikuchi et al.

(10) Patent No.: US 6,782,930 B2
(45) Date of Patent: Aug. 31, 2004

(54) ELASTIC WHEEL

(75) Inventors: Hirohumi Kikuchi, Kawasaki (JP); Katsumi Tashiro, Fuchu (JP); Masanori Murase, Hidaka (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/168,511

(22) PCT Filed: Dec. 21, 2000

(86) PCT No.: PCT/JP00/09058

§ 371 (c)(1), (2), (4) Date: Jun. 21, 2002

(87) PCT Pub. No.: WO01/45965

PCT Pub. Date: Jun. 28, 2001

(65) Prior Publication Data

US 2002/0189731 A1 Dec. 19, 2002

(30) Foreign Application Priority Data

Dec. 21, 1999 (JP) .......................................... 11/363361
Dec. 21, 1999 (JP) .......................................... 11/363362
Mar. 21, 2000 (JP) ...................................... 2000-079066

(51) Int. Cl.[7] .................................................. B60B 9/10
(52) U.S. Cl. ........................................... 152/44; 152/41
(58) Field of Search ............................. 152/17, 40, 41, 152/42, 43, 47, 48, 49, 50

(56) References Cited

U.S. PATENT DOCUMENTS 1,208,940 A * 12/1916 Frommann ................... 152/50
2,282,589 A * 5/1942 Mayne
2,609,856 A * 9/1952 Paton .......................... 152/50
2,830,637 A 4/1958 Deuring et al.
2,891,593 A * 6/1959 Deuring at al. ............... 152/49
2,915,100 A 12/1959 Mantzel et al.
2,921,811 A * 1/1960 Trevaskis
2,951,562 A * 9/1960 Sampson ................ 188/264 D
3,130,766 A * 4/1964 Arnot
3,288,193 A * 11/1966 Mantzel ........................ 152/49
4,549,590 A 10/1985 Sahagian
4,765,382 A * 8/1988 Sahagian ..................... 152/48

FOREIGN PATENT DOCUMENTS

JP 57-732203 A 5/1982
JP 590188701 A 12/1984
JP 05-338401 A 12/1993
WO WO 98/33666 A1 8/1998

* cited by examiner

*Primary Examiner*—Russell D. Stormer
(74) *Attorney, Agent, or Firm*—Sughrue Mion, PLLC

(57) ABSTRACT

An elastic wheel, comprising a disk (1) having a base rim (2) and a rim (3) pivotally supporting a tire (10), wherein a projected part (5) with a generally trapezoidal cross-section in the wheel axis direction is formed in a well of the rim (3), and a pair of elastic rubber bodies (6) are provided annually between the outer surfaces of a pair of wall parts **(4*a*, 4*b*) formed by bending the both sides of the base rim (2) at a sharp angle and the rim inner peripheral surface of the generally trapezoidal projected part (5), whereby vibration can be absorbed by both the shearing deformation and compressive deformation of the installed elastic rubber bodies (6)** so as to increase riding comfort, vibration proofing, and sound proofing performances in the area ranging from small input to large input, the sound proofing performance being very effective for sound in a high frequency area of 100 Hz or higher.

11 Claims, 5 Drawing Sheets

ELASTIC WHEEL

TECHNICAL FIELD

The present invention relates to an elastic wheel for use in a wheel of a vehicle, and more particularly, to an elastic wheel which has superior riding comfort and vibration proofing and sound proofing performances, and with which a car can be driven with high safety even when the inner pressure is reduced.

BACKGROUND ART

Generally, elastic wheels have a disk fixed to an axle hub and a rim supporting a tire, respectively. There have been proposed different types of elastic wheels in which vibration-isolators are provided between disks and rims for enhancement of the vibration isolating performance and the riding comfort. For example, Japanese Unexamined Utility Model Publication No. 59-188701 purposes a tire wheel which uses a spring as a vibration isolator for enhancement of riding comfort.

Moreover, there have been wheels in which as vibration isolators, rubber is arranged between rims and disks. For example, an elastic wheel having a structure in which the rim is connected to the disk via a rubber elastic member is proposed in Japanese Unexamined Utility Model Publication No. 57-73203. Moreover, Japanese Unexamined Patent Application Publication No. 5-338401 discloses an elastic wheel in which a gap is formed between the rim and the elastic wheel, and a vibration isolating rubber is provided in the gap. Furthermore, WO Publication No. 98/33666 discloses a wheel barrier assembly in which an annular strip made of rubber is arranged between a rim and an inner rim having the same profile as the rim.

However, in the case of conventional elastic wheels using rubber as vibration isolators which are uniformly arranged between rims and disks, an elastic rubber body is arranged between the inner peripheral surface of a rim and the outer peripheral surface of a disk and bonded to them by vulcanization. Thus, vibrations in the axial direction, the radial direction, and the rotation direction, transmitted from the rim to the disk via the elastic rubber body, can be adequately suppressed. However, there are problems in that the displacement of the elastic rubber body caused by large loads can not be inhibited. That is, it has been difficult to obtain adequate vibration isolating characteristics in the range of from small input to large input, respectively, since the rubber cross-section is uniform. In this point, similar problems are caused in wheels having springs as vibration-isolators.

Relations of rubbers arranged between rims and disks to their sound proofing performances have not completely been revealed. The sound proofing performance should be still improved.

On the other hand, for run-flat tires, it has been necessary to reinforce the structure of a tire itself. Thus, there are problems in that the tire becomes expensive, the rolling resistance is increased, and the riding comfort is deteriorated, that is, the performances required for ordinary use are deteriorated. Moreover, it has been difficult to develop run-flat tires which are durable to driving a long distance after the tires blow out. Accordingly, it has been investigated to use a run-flat tire and a special wheel in combination. However, no conventional techniques sufficiently take into account the vibration performance and the riding comfort. On the other hand, elastic wheels which are produced for use in run-flat tires and can enhance the above-described performances have not been known. Thus, the structures of the elastic wheels are not durable to run-flat driving.

Accordingly, it is an object of the present invention to provide an elastic wheel of which the riding comfort, and the vibration-proofing and sound-proofing performances are enhanced in the range of from small input to large input without the service life and the safety being deteriorated.

It is another object of the present invention to provide an elastic wheel of which the riding comfort, and the vibration-proofing and sound-proofing performances are enhanced in the range of from small input to large input without the service life and the safety being deteriorated, and which realizes both of the run-flat performances and the riding comfort.

DISCLOSURE OF INVENTION

The inventors have extensively investigated to solve the above-described problems, making the most of the properties of an elastic rubber body as a vibration isolator, and have found that the above-described objects can be achieved by the following constitution. Thus, the present invention has been devised. The elastic wheel of the present invention is as follows.

That is, an elastic wheel of the present invention comprises a disk having a base rim and a rim supporting a tire, wherein a projected part with a generally trapezoidal cross-section in the wheel axis direction is formed in a well of the rim, and a pair of elastic rubber bodies are provided annularly between the outer surfaces of a pair of wall parts formed by bending the both sides of the base rim at a sharp angle and the rim inner peripheral surface of the generally trapezoidal projected part.

Thereby, vibration can be absorbed by both the shearing deformation and the compressive deformation of the installed elastic rubber bodies, and riding comfort, vibration proofing, and sound proofing performances in the range of from small input to large input can be enhanced. Moreover, the sound proofing performance is very effective for sound in a high frequency area of 100 Hz or higher.

Preferably, the generally trapezoidal shape is an isosceles trapezoid. Also, preferably, the angle $\beta 1$ defined by a leg portion constituting the generally trapezoidal shape and the equatorial plane E of the wheel is substantially equal to the angle $\alpha 1$ defined by the outer peripheral surface of one of the wall parts and the equatorial plane E of the wheel. Moreover, preferably, both of the angles $\alpha 1$ and $\beta 1$ are in the range of 0° to 60°. Furthermore, both of the outer end portions in the tire radial direction of the wall parts formed on the both sides of the base rim are connected to each other so as to form a trapezoidal cross-section substantially similar to the generally trapezoidal shape of the rim in the wheel axial direction, and an elastic rubber body is annularly formed between the outer peripheral surface of the plateau portion of the base rim and the inner peripheral surface of the plateau portion of the rim with a gap being formed with respect to one of the outer peripheral surface and the inner peripheral surface. Thereby, even if very large input is applied, large deformation can be prevented, due to the compression action of the elastic rubber body as a stopper provided on the outer peripheral surface of the base rim or the inner peripheral surface of the rim.

Moreover, an elastic wheel of the present invention comprises a disk having a base rim and a rim supporting a tire, wherein a projected part with a semi-circular cross-section in the wheel axis direction is formed in a well of the rim, and a pair of elastic rubber bodies are provided annularly between the outer surfaces of a pair of wall parts formed by bending the both sides of the base rim correspondingly to the semi-circular shape and the rim inner peripheral surface of the semi-circular projected part.

Thereby, vibration can be absorbed by both the shearing deformation and the compressive deformation of the installed elastic rubber bodies, and riding comfort, vibration proofing, and sound proofing performances in the range of from small input to large input can be enhanced. Moreover, the sound proofing performance is very effective for sound in a high frequency area of 100 Hz or higher.

Preferably, both of the outer end portions in the tire radial direction of the wall parts formed on the both sides of the base rim are connected to each other so as to form a semi-circular cross-section in the wheel axis direction substantially similar to the semi-circular shape of the rim, and an elastic rubber body is annularly formed in the center area between the semi-circular outer peripheral surface of the base rim and the semi-circular inner peripheral surface of the rim with a gap being formed with respect to one of the outer peripheral surface and the inner peripheral surface. Thereby, even if very large input is applied, large deformation can be prevented, due to the compression action of the elastic rubber body as a stopper provided on the outer peripheral surface of the base rim or the inner peripheral surface of the rim.

Furthermore, an elastic wheel of the present invention comprises a disk having a base rim and a rim supporting a tire, wherein the wheel includes a pair of guides annularly fixed to the inner peripheral surface of the rim and a pair of wall parts annularly fixed in the both-side areas in the tire axial direction of the outer peripheral surface of the base rim, elastic rubber bodies are annularly formed between the side-surfaces of the guides and the side-surfaces of the wall parts, respectively, and both of the angle $\beta 2$ defined by the side surface of one of the guides and the equatorial plane of the wheel and the angle $\alpha 2$ defined by the side surface of one of the wall parts and the equatorial plane of the wheel are in the range of 0° to 60°.

Thereby, vibration can be absorbed by both the shearing deformation and the compressive deformation of the installed elastic rubber bodies, and riding comfort, vibration proofing, and sound proofing performances in the range of from small input to large input can be enhanced. Moreover, the sound proofing performance is very effective for sound in a high frequency area of 100 Hz or higher.

Furthermore, an elastic wheel of the present invention comprises a disk having a base rim and a rim supporting a tire, wherein a projected part with a generally trapezoidal cross-section in the wheel axis direction is formed in a well of the rim, a pair of elastic rubber bodies are provided annularly between the outer surfaces of a pair of wall parts formed by bending the both sides of the base rim at a sharp angle and the rim inner peripheral surface of the generally trapezoidal projected part, and a thick elastic rubber body is annularly formed on the outer peripheral surface of the plateau portion of the generally trapezoidal projected part.

Thereby, vibration can be absorbed by both the shearing deformation and the compressive deformation of the installed elastic rubber bodies, and riding comfort, vibration proofing, and sound proofing performances in the range of from small input to large input can be enhanced. Moreover, the sound proofing performance is very effective for sound in a high frequency area of 100 Hz or higher. When the inner pressure of a tire is reduced caused by blowing out or the like, so-called run-flat running can be achieved, due to the present of the thick elastic rubber body. In this case, the riding comfort can be also enhanced by the vibration-absorbing action caused by the shearing deformation and the compressive deformation of the elastic rubber body.

Preferably, the generally trapezoidal shape is an isosceles trapezoid. Also, preferably, the angle $\beta$ defined by one of the rim inner peripheral surfaces constituting the leg portions of the wall parts and the equatorial plane of the wheel is substantially equal to the angle $\alpha$ defined by the one of the outer peripheral surfaces of the wall parts and the equatorial plane of the wheel. Moreover, preferably, both of the angles $\alpha$ and $\beta$ are in the range of 0° to 60°.

Furthermore, preferably, both of the outer end portions in the tire radial direction of the wall parts formed on the both sides of the base rim are connected to each other so as to form a trapezoidal cross-section in the wheel axial direction substantially similar to the generally trapezoidal shape of the rim in the wheel axial direction, and an elastic rubber body is annularly formed between the outer peripheral surface of the plateau portion of the base rim and the inner peripheral surface of the plateau portion of the rim with a gap being formed with respect to one of the outer peripheral surface and the inner peripheral surface. Thereby, even if very large input is applied, large deformation can be prevented, due to the compression action of the elastic rubber body as a stopper provided on the outer peripheral surface of the base rim or the inner peripheral surface of the rim. Especially, this is effective in run-flat driving.

BEST MODE FOR CARRYING OUT THE INVENTION

Hereinafter, embodiments of the present invention will be described.

Figure 1:
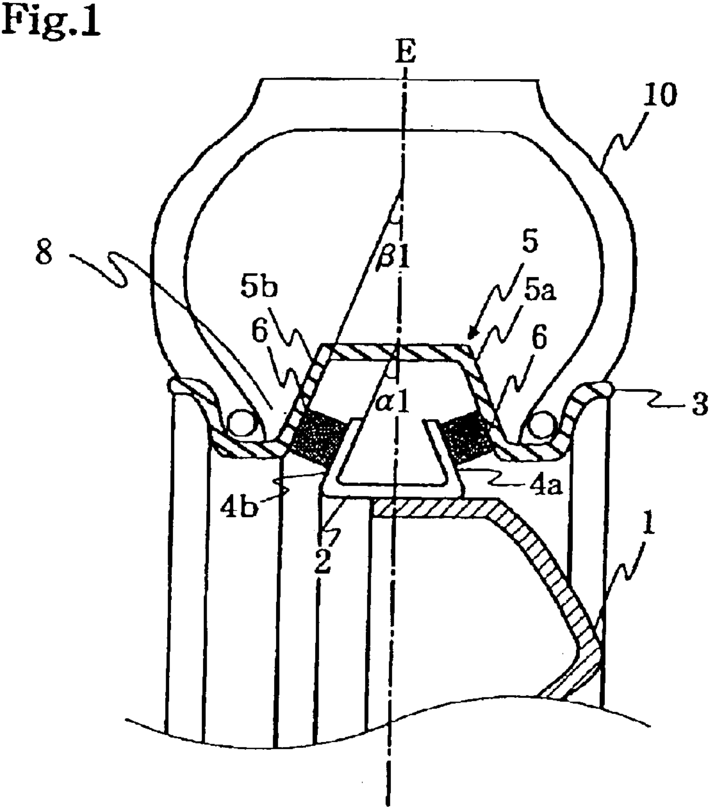
FIG. 1 is a cross-sectional view of an enlarged portion of an elastic wheel according to an embodiment of the present invention.

The elastic wheel of an embodiment of the present invention shown in FIG. 1 comprises a disk 1 which is fixed to an axle hub (not shown) and is provided with a base rim 2, and a rim 3 supporting a tire 10. The disk 1 and the base rim 2 may be integrally molded. The wheel may be a spoke wheel having a support or a mesh wheel such as spokes, a mesh, or the like combined therewith. Material of the disk 1 is not particularly limited, and may be steel, aluminum, magnesium, synthetic resin or the like. If it is especially desired to reduce the weight of the disk 1, aluminum or a synthetic resin is preferably employed. The rim 3 supporting the tire 10 having has a well portion 8 and a projected part 5 with a generally trapezoidal cross-section in the wheel axis direction is annularly formed. Regarding the generally trapezoidal shape of the projected part 5, the leg portions 5*a* and 5*b* need not to be isosceles. However, for well-balanced absorption of vibration, preferably, the leg portions 5*a* and 5*b* are isosceles.

The both sides of the base rim 2 are bent at a sharp angle to form a pair of wall parts 4*a* and 4*b*. A pair of elastic rubber bodies 6 are provided annularly between the outer peripheral surfaces of the wall parts 4*a* and 4*b* and the leg portions 5*a* and 5*b*. The elastic rubber bodies 6 are bonded between the outer peripheral surfaces of the wall parts 4*a* and 4*b* and the inner peripheral surfaces of the leg portions 5*a* and 5*b* by a bonding means such as vulcanization. An angle $\alpha 1$ defined by one of the outer peripheral surfaces of the wall parts 4*a* and 4*b* and the equatorial plane E of the wheel does not need to be equal to an angle $\beta 1$ defined by one of the leg portions 5*a* and 5*b* of the generally trapezoidal projected part 5 and the equatorial plane E. For example, the angle $\alpha 1$ may be larger than the angle $\beta 1$, whereby this structure is more suitable for compressive deformation of the elastic rubber bodies 6 than shearing deformation thereof. However, the angle $\alpha 1$ and the angle $\beta 1$ are preferably set to be equal to each other that the shearing-deformation and the compressive deformation of the elastic rubber bodies 6 become well-balanced. Preferably, both of the angle $\alpha 1$ and the angle $\beta 1$ are preferably in the range of 0° to 60°, more preferably, 0° to 30°.

Figure 2:
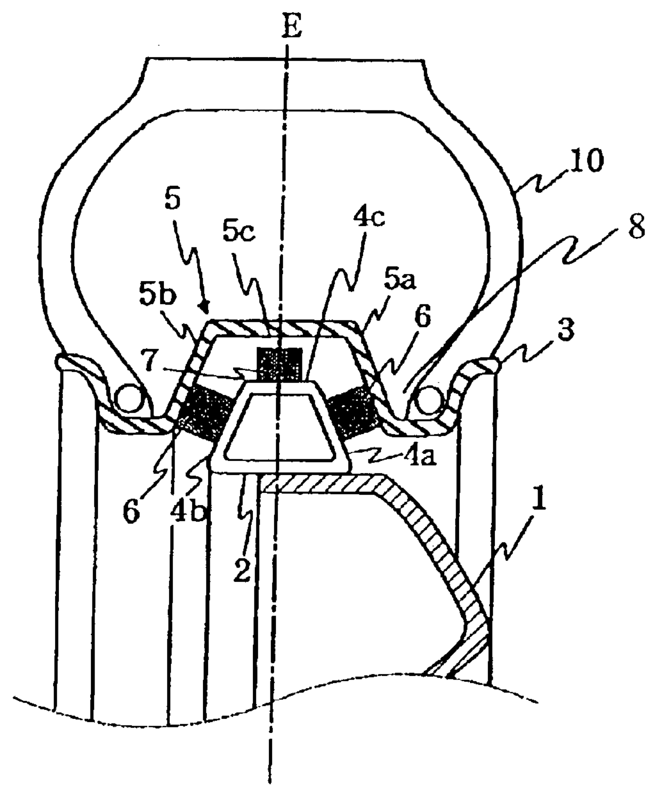
FIG. 2 is a cross-sectional view of an enlarged portion of an elastic wheel according to another embodiment of the present invention.

In the elastic wheel of the another embodiment shown in FIG. 2, the outer end portions in the tire radial direction of the wall parts 4*a* and 4*b* of the base rim 2 are connected to each other forming a plateau portion of the base rim 2. Thus, a tube with a generally trapezoidal shape substantially similar to that of the generally trapezoidal projected part 5. In the case in which the base rim 2 is the above-described tubular body, an elastic rubber body 7 can be provided annularly between the outer peripheral surface 4*c* of the plateau portion of the base rim 2 and the inner peripheral surface 5*c* of the plateau portion of the rim 3. Thus, the elastic rubber body 7 can function as a stopper against large input. In an example shown in FIG. 2, the elastic rubber body 7 is bonded to the outer peripheral surface 4*c* of the base rim 2. A gap is provided between the elastic rubber body 7 and the inner peripheral surface 5*c* of the rim 3. The elastic rubber body 7 may be bonded to the inner peripheral surface 5*c* of the rim 3. A gap may be provided between the elastic rubber body 7 and the outer peripheral surface 4*c* of the base rim 2.

Figure 3:
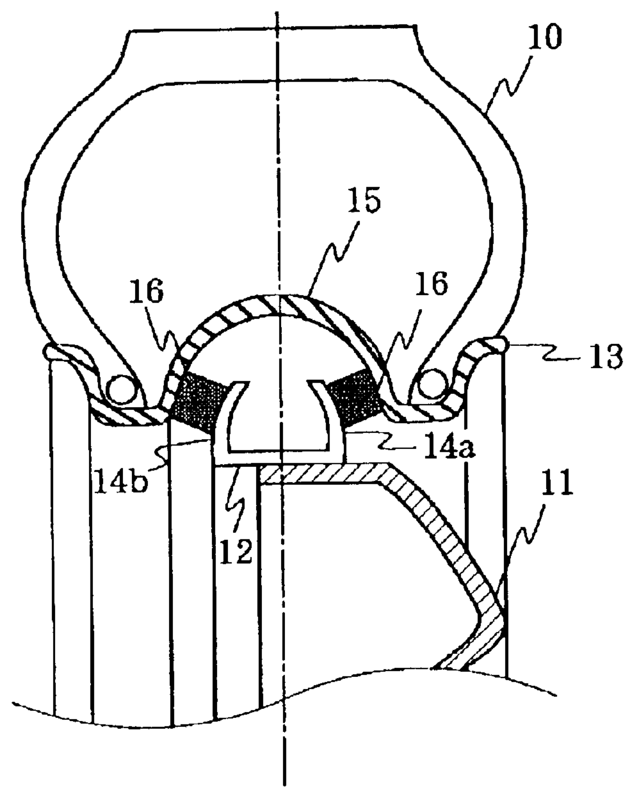
FIG. 3 is a cross-sectional view of an enlarged portion of an elastic wheel according to yet another embodiment of the present invention.

FIG. 3 shows an elastic wheel according to still another embodiment of the present invention. In this preferred embodiment, the elastic wheel comprises a disk 11 having a base rim 12 and fixed to an axle hub (not shown), and a rim 13 supporting the tire 10. A projected part 15 with a semi-circular cross-section in the wheel axial direction is annularly formed in the rim 13. On the other hand, a pair of wall parts 14 which are bent correspondingly to the semi-circular projected part 15 are provided on both sides of the base rim 12. A pair of elastic rubber bodies 16 are provided annularly between the outer peripheral surfaces of the wall parts 14*a* and 14*b* and the inner peripheral surface of the projected part 15 of the rim 13 formed as described above. A pair of the elastic rubber bodies 16 are bonded to the outer peripheral surfaces of the wall parts 14*a* and 14*b* and the inner peripheral surface of the projected part 15 of the rim 13 by a bonding means such as vulcanization.

Figure 4:
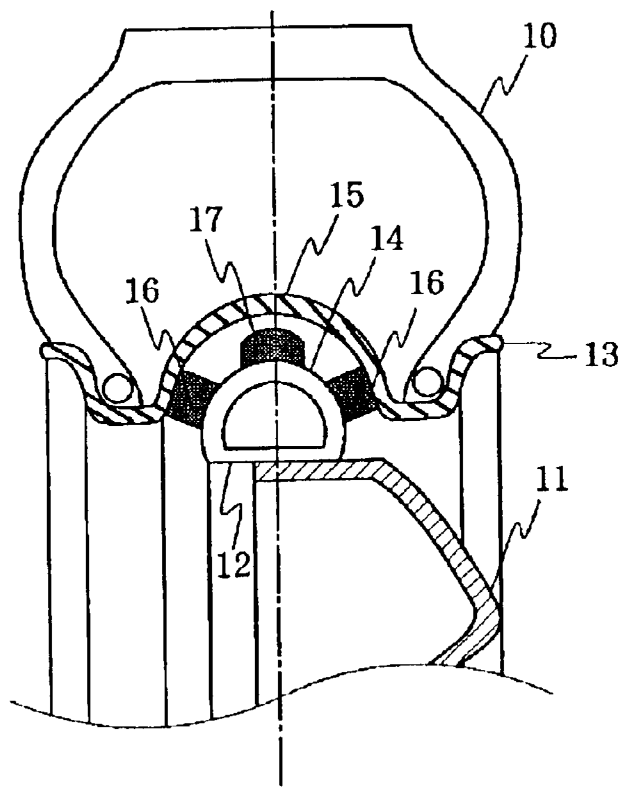
FIG. 4 is a cross-sectional view of an enlarged portion of an elastic wheel according to another embodiment of the present invention.

FIG. 4 shows an elastic wheel according to yet another embodiment of the present invention. In this preferred embodiment, the outer end portions in the tire-axial direction of the of the wall parts formed on both sides of the base rim are connected to each other. Thus, a tubular body having a semicircular shape substantially similar to that of the above-described semicircular projected part of the rim 13 is formed. In the case in which the base rim 12 is formed as the above-described tubular body, a pair of the elastic rubber bodies 16 are provided annularly between the outer peripheral surface 14 of the base rim 12 and the inner peripheral surface of the semi-circular projected part 15 of the rim 13 and on the opposite sides of the base rim 12, as shown in FIG. 4, and moreover, an elastic rubber body 17 can be bonded to the outer peripheral surface of the base rim 12 and functions as a stopper against large input. A pair of the elastic rubber bodies 16 are bonded to the outer peripheral surface 14 of the base rim 12 and the inner peripheral surface of the semi-circular projected part 15 of the rim 13 by a bonding means such as vulcanization. As a pair of the elastic rubber bodies 16 are positioned nearer to the disk 11, the shearing deformation becomes larger than the compressive deformation. To the contrary, as the bodies 16 are positioned to be farther from the disk 11, the compressive deformation becomes larger. The elastic rubber body 17 is bonded to the outer peripheral surface 14 of the base rim 12, and a gap is provided between the semi-circular projected part 15 of the rim 13 and the inner peripheral surface of the semi-circular projected part 15. However, the elastic rubber body 17 may be bonded to the inner peripheral surface of the semi-circular projected part 15 of the rim 13, and a gap may be provided between the elastic rubber body 17 and the outer peripheral surface 14 of the base rim 12.

Figure 5:
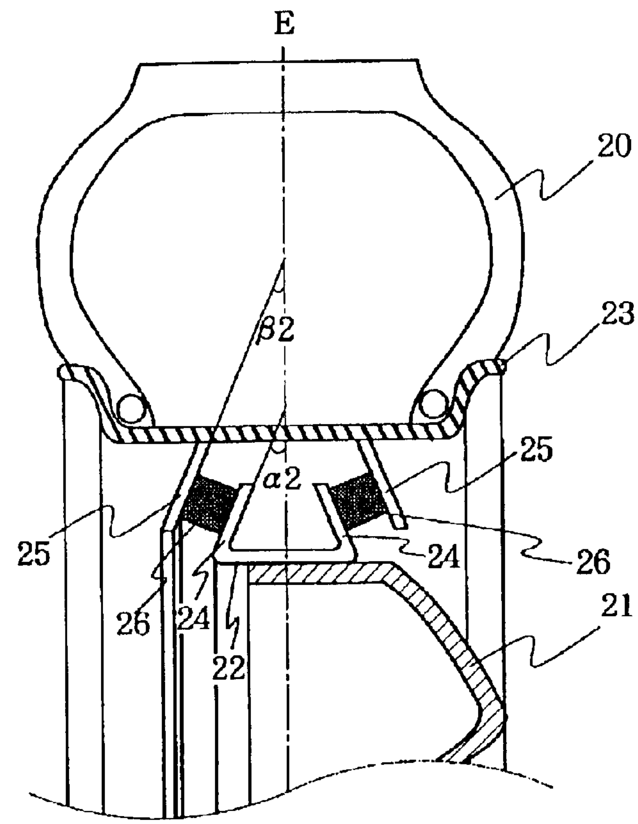
FIG. 5 is a cross-sectional view of an enlarged portion of an elastic wheel according to yet another embodiment of the present invention.

In an elastic wheel of another embodiment of the present invention shown in FIG. 5, a disk 21 fixed to an axle hub (not shown) has a base rim 22. A pair of guides 25 are annularly fixed to the inner peripheral surface of the rib 23 supporting a tire 20. On the other hand, a pair of walls 24 are annularly fixed to the opposite ends in the axle direction of the outer peripheral surface of the base rim 22 and between the guides 25. An angle $\beta 2$ defined by the side-surface of the guide 25 and the equatorial plane E of the wheel does not need to be equal to an angle $\alpha 2$ defined by the side-surface of the wall part and the equatorial plane E of the wheel. For example, the angle $\alpha 2$ may be larger than the angle $\beta 2$, whereby this structure is more suitable for compressive deformation of the elastic rubber bodies 26 than for shearing deformation thereof. Preferably, the angles are set to be substantially equal to each other so that the shearing-deformation and the compressive deformation of the elastic rubber bodies 26 become well-balanced, as in the above-described case. Preferably, both of the angles $\alpha 2$ and $\beta 2$ are in the range of 0° to 60°. The elastic rubber bodies 26 are provided annularly between the inner surfaces of both of the guides 25 and the outer surfaces of the wall parts 24 and bonded thereto by a bonding means such as vulcanization.

Figure 6:
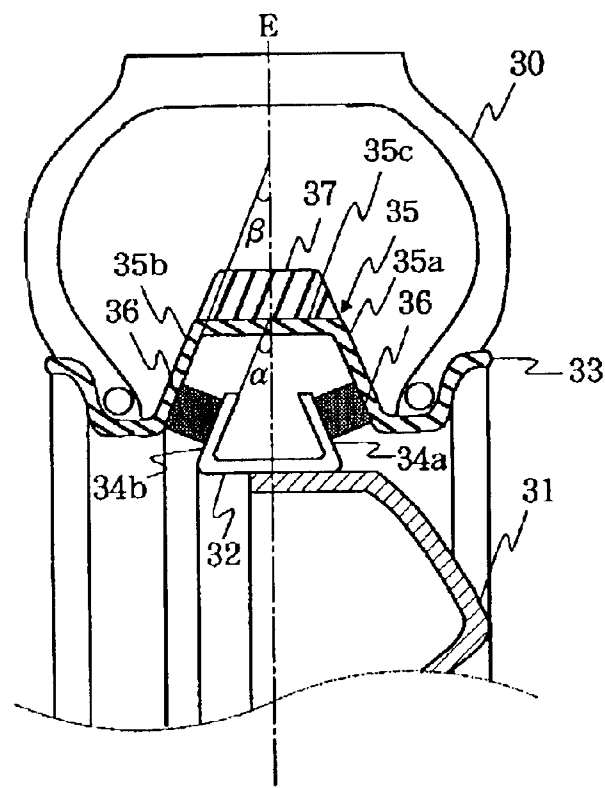
FIG. 6 is a cross-sectional view of an enlarged portion of an elastic wheel according to still another embodiment of the present invention.

The elastic wheel of still another embodiment of the present invention shown in FIG. 6 comprises a disk 31 which is fixed to an axle hub (not shown) and is provided with a base rim 32, and a rim 33 supporting a tire 30. A projected part 35 with a generally trapezoidal cross-section in the axial direction of the wheel is annularly formed in the rim 33 supporting the tire 30. Regarding the generally trapezoidal shape of the projected part 35, the leg portions 35*a* and 35*b* need not to be isosceles. However, for well-balanced absorption of vibration, preferably, the leg portions 5*a* and 5*b* are isosceles.

According to the present invention, preferably, a thick elastic rubber body 37 is annularly formed on the outer peripheral surface 35*c* of the plateau portion of the generally trapezoidal projected part 37 so that the car can be run-flat driven when a tire blows out, and the inner pressure of the tire is reduced. The gauge in the tire radial direction of the thick elastic rubber body 37 may be appropriately selected, correspondingly to the height of the generally trapezoidal projected part 35. From the standpoint of the run-flat driving, preferably, the width in the axle direction of the thick elastic rubber body 37 may be set to be substantially equal to that of the plateau portion of the projected part 35. However, to reduce the weight of the wheel, the thick elastic rubber body 37 may be formed not ranging the overall width of the plateau portion but in a plural thin-strip shape. The thick elastic rubber body 37 and the plateau portion of the projected part 35 are bonded to each other by a bonding means such as vulcanization, for example.

On the other hand, a pair of wall parts 34*a* and 34*b* are formed by bending the both side portions of the base rim 32 at a sharp angle. A pair of the elastic rubber bodies 36 are annularly formed between the outer peripheral surfaces of the wall parts 34*a* and 34*b* and the leg portions 35*a* and 35*b* of the projected part 35 of the rim 33. The elastic rubber bodies 36 are bonded between the outer peripheral surfaces of the wall parts 34*a* and 34*b* and the leg portions 35*a* and 35*b* by a bonding means such as vulcanization. An angle $\alpha$ defined by the outer peripheral surfaces of the wall parts 34*a* and 34*b* and the equatorial plane E of the wheel does not need to be equal to an angle $\beta$ defined by the leg portions 35*a* and 35*b* of the generally trapezoidal projected part 35 and the equatorial plane E. For example, the angle $\alpha$ may be larger than the angle $\beta$, whereby this structure is more suitable for compressive deformation of the elastic rubber bodies 36 than shearing deformation thereof. However, the angles $\alpha$ and $\beta$ are preferably set to be equal to each other that the shearing-deformation and the compressive deformation of the elastic rubber bodies 36 become well-balanced. Preferably, both of the angles $\alpha$ and $\beta 1$ are preferably in the range of 0° to 60°, more preferably, 0° to 30°.

Figure 7:
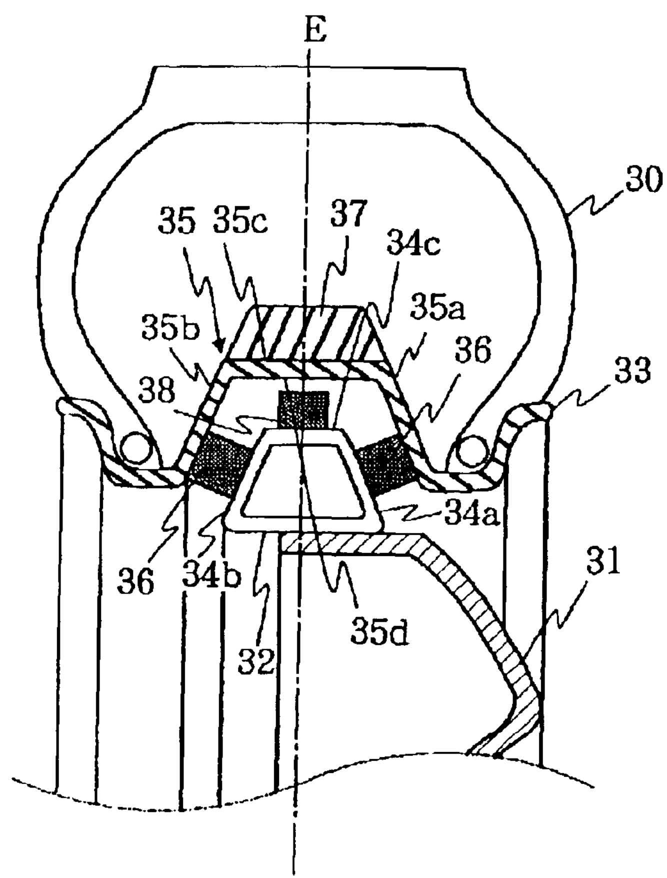
FIG. 7 is a cross-sectional view of an enlarged portion of an elastic wheel according to another embodiment of the present invention.

In the elastic wheel of still another embodiment shown in FIG. 7, the outer end portions in the tire radial direction of the wall parts 34*a* and 34*b* of the base rim 32 are connected to each other. Thus, a tube with a generally trapezoidal shape substantially similar to that of the generally trapezoidal projected part 35. In the case in which the base rim 32 is the above-described tubular body, an elastic rubber body 38 can be provided annularly between the outer peripheral surface 34*c* of the base rim 32 and the inner peripheral surface 35*d* of the rim 33. Thus, the elastic rubber body can function as a stopper against large input. In an example shown in FIG. 7, the elastic rubber body 38 is bonded to the outer peripheral surface 34*c* of the base rim 32. A gap is provided between the elastic rubber body 38 and the inner peripheral surface 35*d* of the rim 33. The elastic rubber body 38 may be bonded to the inner peripheral surface 35*d* of the rim 33. A gap may be provided between the elastic rubber body 38 and the outer peripheral surface 34*c* of the base rim 32.

Also, in this preferred embodiment, preferably, the thick elastic rubber body 37 is annularly formed on the outer peripheral surface 35*c* of the plateau portion of the generally trapezoidal projected part 35 so that the car can be run-flat driven when a tire blows out, and the inner pressure of the tire is reduced. Large input can be easily applied when the car runs-flat. Thus, the elastic rubber body 38 is advantageous.

As the elastic rubber body used in this embodiment, publicly-known vibration-isolating rubbers may be used. Natural or synthetic rubbers, for example, diene type rubbers such as butadiene rubber, styrene rubber, styrene-butadiene copolymer rubbers, and butyl rubbers may be compounded with suitable compounding agents such as sulfur, a vulcanization accelerator, an age resistor, carbon black, and so forth for use. Preferably, the elastic rubber body has a JIS A hardness (Hd) of 30 to 80° and a modulus of elasticity of $1\times10^3$ to $1\times10^5$ N/cm$^2$.

The evaluation test of the performances of the elastic wheels of embodiments of the present invention was made. The results will be described below.

An elastic wheel containing elastic rubber bodies having a shape and size shown in FIG. 1 and annularly mounted therein was trially manufactured in the following conditions. A tire having a size of 185/55R15 was mounted onto the elastic wheel. The vibration absorption and sound proofing performances were evaluated. The evaluation method is as follows.

(Rim) size: 15 inches
 width: 5.5 J
(Elastic Rubber Body)
 size: width (W) 25 mm, height (H) 17 mm (See FIG. 8*a*)
 set angle: angle $\alpha$1=45°, angle $\beta$1=45°
 Hardness A of JIS (Japanese Industrial Standard): 60°
 modulus of elasticity: $4\times10^4$ N/cm$^2$
(Vibration Absorbing Characteristic)
 The axle force at practical running was measured by means of an acceleration sensor.
(Sound Proofing Characteristic)
 A micron-phone was set on the head of a driving seat. Sound pressure at practical running of a car was measured.

As a result of the test of the above-described vibration absorbing characteristics, it has been identified that the elastic wheel of the above-described example can absorb vibration by both of the shearing deformation and the compressive deformation of the elastic rubber bodies 6. Thus, the riding comfort, the vibration proofing and the sound proofing performances can be enhanced without the service life and the safety being deteriorated. Moreover, it has been revealed that the elastic wheel is most effective for sound in a high frequency area of 100 Hz or higher. Also, regarding the other embodiments described above, similar advantages could be obtained. The elastic wheels shown in FIGS. 6 and 7 were durable to run-flat driving a such a long distance as required for practical use when the inner pressure of a tire is reduced, due to blowing out or the like. In this case, the riding comfort was superior to that at conventional run-flat running.

Then, models of elastic rubber bodies of inclination-type (FIG. 8*a*), shearing-type (FIG. 8*b*), and compression-type (FIG. 8*c*) were formed. The elastic rubber bodies were made of the same material, and the volumes were substantially the same for all the types shown in FIG. 8.

Figure 8:
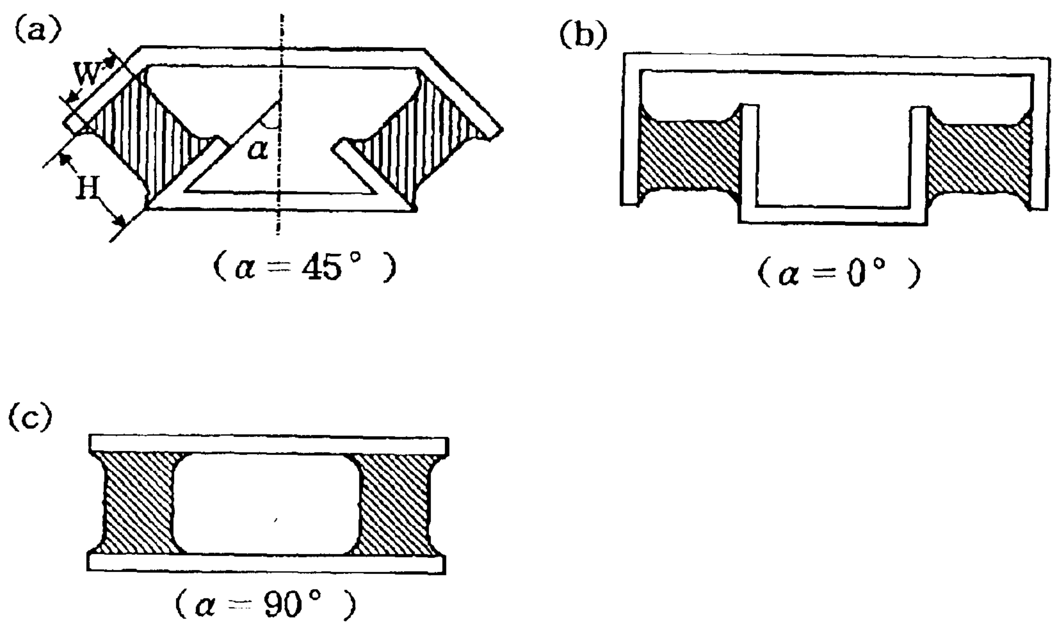
FIGS. 8*a*, 8*b*, and 8*c* consists of cross-sectional views of different types of elastic rubber bodies, respectively.
Figure 9:
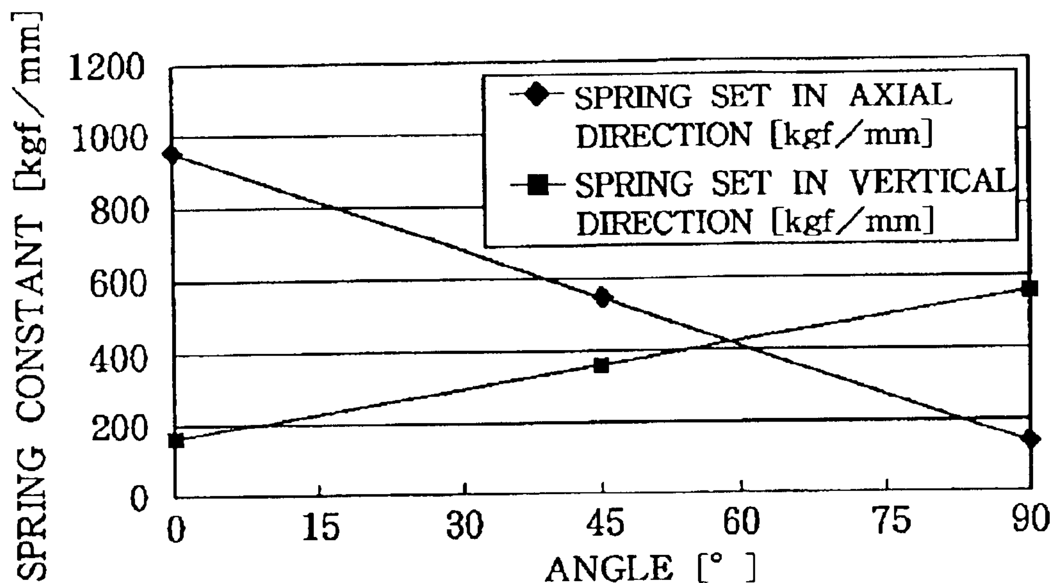
FIG. 9 is a graph showing a relation between the inclination angles and the spring factors of the elastic rubber bodies.
Figure 10:
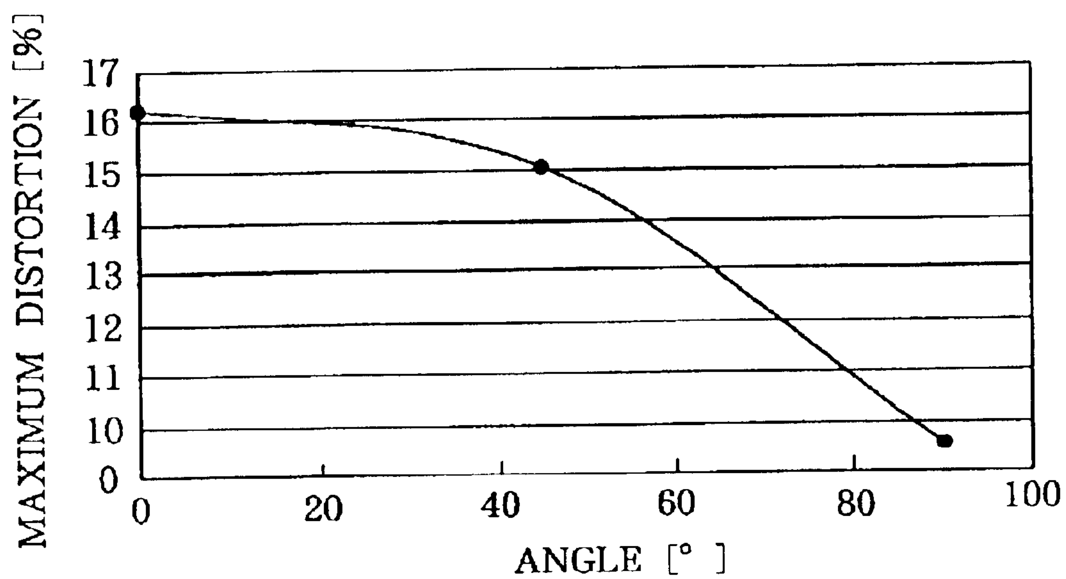
FIG. 10 is a graph showing a relation between the inclination angles and the maximum distortions of the elastic rubber body.

The relation between the set angles ($\alpha$) of the elastic rubber bodies, as shown in FIGS. 8(*a*) to (*c*), and the spring constants for input in the vertical and axial directions, and the relation between the set angles (α) and the maximum distortions (%) were obtained. FIGS. 9 and 10 show the obtained results. As seen in the graph of FIG. 9, as α is smaller, the spring constant in the axial direction becomes larger than that in the vertical direction. Thus, it is understood that the steering-stability is high. Moreover, it is seen in FIG. 10 that as α is larger, the maximum distortion becomes smaller, that is, the service life is long. As a result, it has been confirmed that both of the service life and the steering-stability can be obtained by setting α to be in the range of 0° to 60°.

INDUSTRIAL APPLICABILITY

As described above, according to the elastic wheel of the present invention, the riding comfort, the vibration proofing and the sound proofing performances can be enhanced in the range of from small input to large input without the service life and the safety being deteriorated. In addition, both of the run-flat running and the riding comfort can be enhanced.

What is claimed is:

1. An elastic wheel comprising a disk having a base rim and a rim supporting a tire, said rim including a well and a projected part with a generally trapezoidal cross-section in the wheel axis direction projecting outward from the well, said base rim including a pair of wall parts, and said wheel further comprising a pair of elastic rubber bodies disposed annularly between outer surfaces of the pair of wall parts and an inner peripheral surface of the projected part, and wherein an angle β1 defined by a leg portion constituting the generally trapezoidal shape and an equatorial plane E of the wheel is substantially equal to an angle α1 defined by an outer peripheral surface of one of the wall parts and the equatorial plane E of the wheel.

2. An elastic wheel according to claim 1, wherein the generally trapezoidal shape is an isosceles trapezoid.

3. An elastic wheel according to claim 1, wherein both of the angles α1 and β1 are in the range of 0° to 60°.

4. An elastic wheel according to claim 1, wherein outer end portions in the tire radial direction of the wall parts are connected to each other so as to form a trapezoidal cross-section substantially similar to the generally trapezoidal shape of the projected part in the wheel axis direction, and another elastic rubber body is annularly disposed between a plateau portion of the base rim and a plateau portion of the rim with a gap being formed with respect to one of the plateau portions.

5. An elastic wheel comprising a disk having a base rim and a rim supporting a tire, said rim including a well and a projected part with a semi-circular cross-section in the wheel axis direction projecting from the well, said base rim including a pair of wall parts, and said wheel further comprising a pair of elastic rubber bodies disposed annularly between outer surfaces of the pair of wall parts and an inner peripheral surface of the projected part.

6. An elastic wheel according to claim 5, wherein outer end portions in the tire radial direction of the wall parts are connected to each other so as to form a semi-circular cross-section in the wheel axis direction substantially similar to the semi-circular shape of the projected part, and another elastic rubber body is annularly disposed in an area between an outer peripheral surface of the base rim and the inner peripheral surface of the projected part with a gap being formed with respect to one of the outer peripheral surface and the inner peripheral surface.

7. An elastic wheel comprising a disk having a base rim and a rim supporting a tire, said rim including a well and a projected part with a generally trapezoidal cross-section in the wheel axis direction projected from the well, said base rim including a pair of wall parts, and said wheel further comprising a pair of elastic rubber bodies disposed annularly between outer surfaces of the pair of wall parts and an inner peripheral surface of the projected part, and another elastic rubber body is annularly disposed between a plateau portion of the projected part and a plateau portion of the base rim.

8. An elastic wheel according to claim 7, wherein the generally trapezoidal shape is an isosceles trapezoid.

9. An elastic wheel according to claim 7 or 8, wherein an angle β defined by one of the rim inner peripheral surfaces and an equatorial plane of the wheel is substantially equal to an angle α defined by one of the outer peripheral surfaces of the wall parts and the equatorial plane of the wheel.

10. An elastic wheel according to claim 9, wherein both of the angles α and β are in the range of 0° to 60°.

11. An elastic wheel according to claim 7, wherein outer end portions in the tire radial direction of the wall parts are connected to each other so as to form a trapezoidal cross-section substantially similar to the generally trapezoidal shape of the projected part in the wheel axis direction, and wherein a gap is disposed between the other elastic rubber body and one of said plateau portion of the base rim and the plateau portion of the projecting part.

* * * * *